United States Patent [19]

Blume et al.

[11] Patent Number: 4,952,751

[45] Date of Patent: Aug. 28, 1990

[54] TREATMENT OF EVAPORATOR CONDENSATES BY PERVAPORATION

[75] Inventors: Ingo Blume, Hengelq, Netherlands; Richard W. Baker, Palo Alto, Calif.

[73] Assignee: Membrane Technology & Research, Inc., Menlo Park, Calif.

[21] Appl. No.: 179,490

[22] Filed: Apr. 8, 1988

[51] Int. Cl.$^5$ .............................................. B01D 13/00
[52] U.S. Cl. .................................. 585/818; 208/308; 210/640; 426/387
[58] Field of Search .......................... 210/500.27, 640; 208/308; 159/DIG. 27, DIG. 28; 585/818, 819; 426/387

[56] References Cited

U.S. PATENT DOCUMENTS

| | | | |
|---|---|---|---|
| 2,386,826 | 10/1945 | Wallach et al. | 210/640 |
| 2,913,507 | 11/1959 | Binning et al. | 260/683.44 |
| 2,953,502 | 9/1960 | Binning et al. | 202/42 |
| 2,981,680 | 4/1961 | Binning | 210/23 |
| 3,113,876 | 12/1963 | Smith et al. | 426/387 |
| 3,776,970 | 12/1973 | Strazik | 260/669 A |
| 3,930,990 | 1/1976 | Brun | 208/308 |
| 4,218,312 | 8/1980 | Perry | 210/640 |
| 4,230,463 | 10/1980 | Henis et al. | 55/16 |
| 4,243,701 | 1/1981 | Riley et al. | 427/244 |
| 4,322,448 | 3/1982 | Matsuura et al. | 426/387 X |
| 4,435,437 | 3/1984 | Ziegler | 426/387 X |
| 4,620,900 | 11/1986 | Kimura | 202/172 |

OTHER PUBLICATIONS

Membrane Processes for Effluent Treatment Pepper.
"Handbook of Separation Process Technology", Rousseau, Chapter 21, 1987 pp. 955-969.
DOE Rept. EV-0081 "Processing Needs and Methodology for Wastewaters from the Conversion of Coal, Oil Shale, and Biomass to Synfuels", pp. 15-29, 80.
Kesting, R. E., "Synthetic Polymeric Membranes" 2nd Edition, John Wiley & Sons, N.Y. Ch. 7, 1985.
Kremen, S. S. "Technology and Engineering of Roga Spiral-Wound Reverse Osmosis Modules", in Reverse Osmosis and Synthetic Membranes, S. Sourirajan, Ed., Nat'l Res. Council Canada, Ch. 17, 1977.
W. W. Grainger, Inc., Chicago, IL 60648, Industrial and Commercial Equipment, Components and Supplies, Catalog #374, Fall, 1988.

*Primary Examiner*—Glenn Caldarola
*Attorney, Agent, or Firm*—J. Farrant

[57] ABSTRACT

A pervaporation process for separating organic contaminants from evaporator condensate streams is disclosed. The process employs a permselective membrane that is selectively permeable to an organic component of the condensate. The process involves contacting the feed side of the membrane with a liquid condensate stream, and withdrawing from the permeate side a vapor enriched in the organic component. The driving force for the process is the in vapor pressure across the membrane. This difference may be provided for instance by maintaining a vacuum on the permeate side, or by condensing the permeate. The process offers a simple, economic alternative to other separation techniques.

8 Claims, 5 Drawing Sheets

TREATMENT OF EVAPORATOR CONDENSATES BY PERVAPORATION

FIELD OF THE INVENTION

The invention relates to treatment of condensate liquids from commercial evaporation processes. More particularly, the invention relates to recovery of volatile organic components in the condensate by subjecting the condensate to a pervaporation process.

BACKGROUND OF THE INVENTION

Evaporation is a widely used separation technique in processing industries. Evaporation is used for instance to recover solvents in the plastics and metal finishing industries, particularly electroplating, in the pulp and paper industry to concentrate black liquor prior to incineration, and in the flavor and fragrance industries to concentrate raw products or recover valuable essences. In principle, evaporation involves concentration of a solution containing a non-volatile solute and a volatile solvent, usually water. Pure solvent is driven off and condensed, leaving an enriched concentrate. However, in many practical instances, the condensate from the evaporator also contains impurities that it is desirable to remove, either because they present a pollution problem preventing direct discharge of the condensate to the environment, or because they have economic value. For example, pulp mill water vapor condensates may contain 500 ppm or more methanol, as well as various oils and other organic substances. Both to reduce the pollution caused by discharging these streams directly, and to recover the methanol, it may be desirable to subject the condensate to a further treatment process. In application like this, where the condensate comprises an aqueous stream with a low concentration of organic contaminants, carbon adsorption is a widely used treatment process. A disadvantage of carbon adsorption, however, is the limited life of the activated carbon bed. Either the process must be interrupted while the bed is regenerated, or multiple beds in parallel must be available. Recovery of the adsorbed organics frequently involves the use of steam, or another solvent phase to desorb the organic, necessitating yet more treatment to separate this stream. Air stripping of the condensate stream is also possible, but creates odor and air pollution problems when the stream containing the stripped organic is discharged to the atmosphere. In the case of fruit juice processing, most fruit juices derive their flavor and aroma from organic components known as essences. When the fruit juice is concentrated, typically by multiple-effect evaporation, these essences are driven off with the evaporated water vapors. The essence-bearing evaporator condensate fractions from the various steps of the process are then separated by distillation to recover the concentrated essence. However, distillation is an energy-intensive, expensive process, especially with these streams that contain relatively small concentrations of organic constituents in large volumes of water. In the case of azeotropic mixtures, effective separation by distillation may not be commercially feasible. Another specific problem, particularly when handling citrus essences, is that the high temperatures involved in distillation may destroy the oily portion of the essence, with resulting loss of quality. From the above discussion it may be seen that in general, there is a need for an alternative improved separation process for handling evaporator condensates.

Pervaporation is a membrane separation process that has been applied to the separation of azeotropic mixtures. See, for example, U.S. Pat. Nos. 2,913,507, 2,953,502 and 2,981,680 to Binning et al. In particular, pervaporation can be used to dehydrate mixtures such as ethanol/water or ethyl acetate/water. Depending on the type of membrane used, the process may theoretically be water-selective or organic-selective, although to date the only available pervaporation systems use water-selective membranes. It is also known to separate hydrocarbon mixtures using pervaporation. For example, U.S. Pat. No. 3,930,990 to Brun et al. describes separation of butadiene from isobutene by pervaporation. U.S. Pat. No. 3,776,970, to Strazik et al. discloses a pervaporation process for separating styrene from ethylbenzene. U.S. Pat. No. 4,620,900, to Kimura e al., describes the use of a thermopervaporation process as an alternative to evaporation to remove water from solutions such as black liquor or orange juice.

SUMMARY OF THE INVENTION

It has been discovered in accordance with the invention that volatile organic components can be effectively separated from evaporator condensates by subjecting the condensate to pervaporation. Advantages offered by pervaporation compared with other techniques used in condensate separation include:

(a) Economy. For treating large volumes of condensates, with low organic content, pervaporation systems are very cost competitive with other technologies. The value of organics recovered may be well in excess of the operating costs of the plant.

(b) No regeneration step is required; hence no off-line time.

(c) The process can operate at ambient temperatures, and thus is suitable for treatment of thermally unstable compounds.

It is an object of the invention to provide a process for separating organic components from evaporator condensate streams.

It is an object of the invention to provide a process for purifying waste condensate streams from evaporators, in particular so that the streams may be discharged without causing environmental pollution.

It is an object of the invention to provide a process for recovery of volatile organic components from evaporator condensate streams.

It is an object of the invention to provide an efficient method of treating aqueous streams containing very low concentrations of volatile organic components.

It is an object of the invention to provide a method of processing evaporator condensates from fruit juice processing to recover flavor- and aroma-enhancing compounds known as essences.

It is an object of the invention to provide a method of recovering methanol and/or other organic components from pulp mill vapor condensates.

Other objects of the invention will be apparent from the description to those of ordinary skill in the art.

The above objects are achieved by a pervaporation process. In broad outline the process involves bringing the liquid obtained by condensing the evaporate from a commercial evaporator into contact with the feed side of a permselective membrane. The permselective membrane is selectively permeable to the organic component in the feed stream, which passes preferentially through the membrane and is withdrawn as a vapor on the permeate side of the membrane. The vapor is condensed and may be recycled, subjected to further treatment, or otherwise disposed of as appropriate. The retentate stream contains relatively pure solvent, usually water, that may be recycled to the original process or discharged.

The driving force for pervaporation is the difference in partial vapor pressure on the feed and permeate sides of the membrane. The vapor pressure gradient used to produce a flow across a pervaporation membrane can be generated in a number of ways. In the laboratory, the low vapor pressure required on the permeate side of the membrane is conveniently produced with a vacuum pump. On a commercial scale, it may be more attractive to cool the permeate vapor to condense the liquid. The feed solution may also be heated. In this process, sometimes called thermopervaporation, the driving force is the difference in vapor pressure between the hot feed solution and the cold permeate liquid. Because the cost of providing the cooling and heating required is much less than the cost of a vacuum pump, as well as being operationally more reliable, this type of system is preferred in commercial operations. A third possibility is to sweep the permeate side of the membrane with a carrier gas such as air or steam.

The permselective membrane used in the process differs from presently available commercial pervaporation membranes in that it is selectively permeable to the organic component over the aqueous component of the feedstream. The membrane configuration is not critical. Composite membranes with an ultrathin permselective layer are preferred, because they yield higher fluxes than can be obtained with simple dense thick films. The membranes are deployed preferably as spiral-wound modules. Alternatively, any standard module configuration known in the art, such as plate and frame or hollow fiber, may be used.

The invention is particularly useful for separating organic components from black liquor generated in pulp mills. During the paper making process, an offstream from the wood chip digester and the stock washer, heavily polluted with hydrogen sulfide and organic sulfides, is produced. This may be treated by multiple-effect evaporation, followed by air or steam stripping of the condensate, or carbon adsorption treatment. Pervaporation of the evaporator condensate offers a low-cost low-energy alternative to these conventional treatments. Treatment costs for pervaporation systems are currently in the range $5-15 per 1,000 gallons of feed processed. These costs are substantially lower than many alternative systems. For example, in 1980, typical costs for steam stripping were about $10/1,000 gallons feed, for solvent extraction about $5/1,000 gallons feed, for biological treatment about $10-20/1,000 gallons feed, and for carbon adsorption $6-40/1,000 gallons feed. See, for example, "Capabilities and Costs of Present Technology", pages 15-29 in DOE Report EV-0081, "Processing Needs and Methodology for Wastewaters from the Conversion of Coal, Oil Shale and Biomass to Synfuels", May 1980, which is incorporated herein by reference.

The invention is also particularly useful in fruit juice processing. In this case, as stated above, the evaporator condensates contain valuable essences, which must be recovered for recycling to the concentrated juice, or for other use in the flavor and fragrance industries. Essence recovery is typically achieved by distillation. Depending on the particular application, pervaporation may be cheaper, more effective, and less damaging to the product than distillation.

Other major sources of heavily solvent-contaminated effluents are coal liquefaction and gasification plants. These plants produce large volumes of organic contaminated condensates from evaporative processes. Examples include condensates produced by the cooling of coal-gasification and coal liquefaction reactor effluents, retort water from oil-shale processing, condensate water removed after shift conversion in gasification and so on. These waters often contain as much as 1-2% ammonia and up to 2-4% of various organic solvents. Removal of the contaminates by conventional processes to a level sufficient to allow discharge of the water is estimated to cost around $50/1,000 gallons feed water. An organic-selective pervaporation process which allows the recovery of both ammonia and solvents from the waste stream offers major advantages in both economy and simplicity of the process.

Other separations where the present process might find useful application include, but are not limited to, clean-up of dilute organic-containing aqueous streams form plastics finishing, metal finishing, electroplating, printed circuit board and other semiconductor manufacturing. Recovery of valuable solvents or other organics from these types of condensates is also envisaged.

DETAILED DESCRIPTION OF THE INVENTION

"Essence" as used herein refers to organic compounds, responsible for flavor or aroma, obtained from fruits or other plant parts.

The process of the invention involves pervaporation. Pervaporation is a membrane process which can be used to separate volatile components from liquid solutions. In this process, a permselective membrane separates a liquid feed stream from a low vapor pressure permeate gas stream. Transport through the membrane is induced by maintaining the vapor pressure on the permeate side lower than the partial pressure of the vapor in equilibrium with the liquid on the feed side. Water and organic solvents permeate the membrane at a rate determined by their relative volatiles and their intrinsic permeabilities. The selectivity $\alpha$ of a pervaporation process for component i over component j in the feedstream is defined as the ratio of the concentrations of i and j on the permeate and feed sides of the membrane. Thus $$\alpha = \frac{p''_i/p''_j}{c'_i/c'_j}$$

where $p''_i$ and $p''_j$ are the partial vapor pressures of components i and j on the permeate side, and $c'_i$ and $c'_j$ are the concentrations of i and j in the feed liquid.

The material chosen for the permselective membrane must be preferentially permeable to the organic component of the feedstream over the aqueous component. Cellulosic polymers, which are frequently used in pervaporation processes, for example in dewatering alcohol, are unsuitable in the context of the present invention because they are water selective rather than organic selective. Particularly useful materials for the permselective membrane are polysiloxanes, which are preferably coated onto the support membrane as prepolymers or low-molecular weight polymers, and crosslinked in situ to form silicone rubber. Polymers and prepolymers for forming silicone rubber are obtainable from General Electric Company, Waterford, N.Y. Other hydrophobic rubbery polymers may also be appropriate. The selectivity of the permselective membrane for the more permeable over the less permeable component of the feed should preferably be 5 or more. In general the best separations will be obtained between components where the selectivity is as much as 100 or even more.

In general, the flux of a permeating component through a permiselective membrane is inversely proportional to the thickness of the membrane, i.e. the thinner the membrane, the higher the flux. It is thus preferable to form the membrane as a composite, comprising a microporous support membrane onto which the rubbery permselective layer is deposited as an ultrathin film. The function of the microporous support membrane is to give physical strength to the composite structure, and it has no selective properties per se. It should have a very small flow resistance compared to the permselective layer. Preferably, the microporous support membrane will be an asymmetric membrane with a relatively dense surface layer. The surface pore size should be sufficiently small that the sealing or permselective polymer can form a continuous coating that bridges or plugs the pores without defects. Normally a surface pore size of 1 micron or less is preferred. Techniques for casting finely microporous membranes are well known in the art, and are discussed in detail, for example, in *Synthetic Polymeric Membranes,* Second Edition, Robert E. Kesting, McGraw-Hill, New York (1985), Chapter 7, incorporated herein by reference. Examples of typical polymers that may be used to form microporous supports may be found among those listed in U.S. Pat. No. 4,230,463, Henis and Tripodi, column 14, lines 14 through 54, which is incorporated herein by reference. Typically microporous membranes may be prepared by continuous casting onto a moving fabric web. The finished support membrane should be sufficiently thick to provide some physical robustness to the composite, but not so thick as to impair the permeability characteristics. Generally a thickness of 30-200 microns, is envisaged, with a preferred thickness of approximately 50 microns.

The ultrathin permselective layer may then be deposited on the microporous support by a number of techniques known in the art. A preferred method is solution coating. The principles of this method are described in detail in, for example, U.S. Pat. No. 4,243,701 to R. L. Riley and R. L. Grabowsky, which is incorporated herein by reference. Solvents that may be used for silicone rubbers include isooctane or Freons. A thin film, typically 50-100 microns thick, of the polymer solution is deposited on the microporous support surface by immersing and then slowly withdrawing the support from the solution. When the solvent evaporates, a polymer layer typically 0.1-20 microns thick is left. Preferably the thickness of the permselective membrane layer should be 5 microns or less, most preferably 1 micron or less. Alternatively, the thin polymer film can be deposited first on a surface such as a glass plate, and then floated off onto a water surface and deposited on the microporous substrate in a separate operation.

The finished membranes may be deployed in any module configuration. A preferred configuration for the finished composite membrane is a spiral-wound module, as currently used in some reverse osmosis and gas separation systems. The making of such modules is described in detail in, for instance, in S. S. Kremen, "Technology and Engineering of ROGA Spiral Would Reverse Osmosis Membrane Modules", *Reverse Osmosis and Synthetic Membranes,* S. Sourirajan (Ed), National Research Council of Canada, Ottawa (1977), incorporated herein by reference. Alternately, the membranes may be used in a flat sheet or plate-and-frame configuration. It is also possible to prepare coated microporous hollow fibers and make hollow fiber modules by any of the techniques known in the art.

As stated above, the driving force for pervaporation is the difference in partial vapor pressure on the feed and permeate sides of the membrane. On the feed side of the membrane, the partial vapor pressure of any component will be the partial pressure of the vapor in equilibrium with the feed solution. Changing the hydrostatic pressure of the feed solution thus has a negligible effect on membrane flux or selectivity. On the other hand, changing the permeate pressure has a dramatic effect on flux. In the extreme case where the partial vapor pressure on the permeate side reaches the same value as the partial vapor pressure of the feed side, the trans-membrane flux will fall to zero. Likewise, flux is maximized when the partial pressure on the permeate side is zero. While the particular vapor pressure gradient that can be used in any specific application must be determined in conjunction with the other parameters of the system, in general it is envisaged that a pressure drop approximately in the range 1-30 cmHg is desirable. The lower limit on the vapor pressure drop will be the value below which no useful flux of the permeating component is obtained; the upper limit will be set by the vapor pressure of the feed. The cost and practical difficulty of maintaining a vacuum on the permeate side, however, may mean that the lowest convenient operating pressure on the permeate side is about 1 cmHg or above. A variety of methods may be used to generate the vapor pressure gradient. For bench or laboratory scale units, a small commercial vacuum pump may be most convenient. An embodiment of the invention employing a vacuum pump is shown schematically in FIG. 1. Referring now to this figure, feed solution, 1, from a tank, 2, is pumped by means of a pump, 3, through a membrane module, 4. A vacuum pump, 5, is used to produce the low pressure required on the permeate side of the membrane module. The permeate vapor stream, 6, is trapped in the condenser unit, 7. A nitrogen trap, 8, is included in the system to protect the vacuum pump from any non-condensed vapor. The retentate stream, 9, from the membrane module is recirculated to the feed tank. The pumps, condensers, and nitrogen trap are all standard laboratory or commercial equipment.

Figure 2:
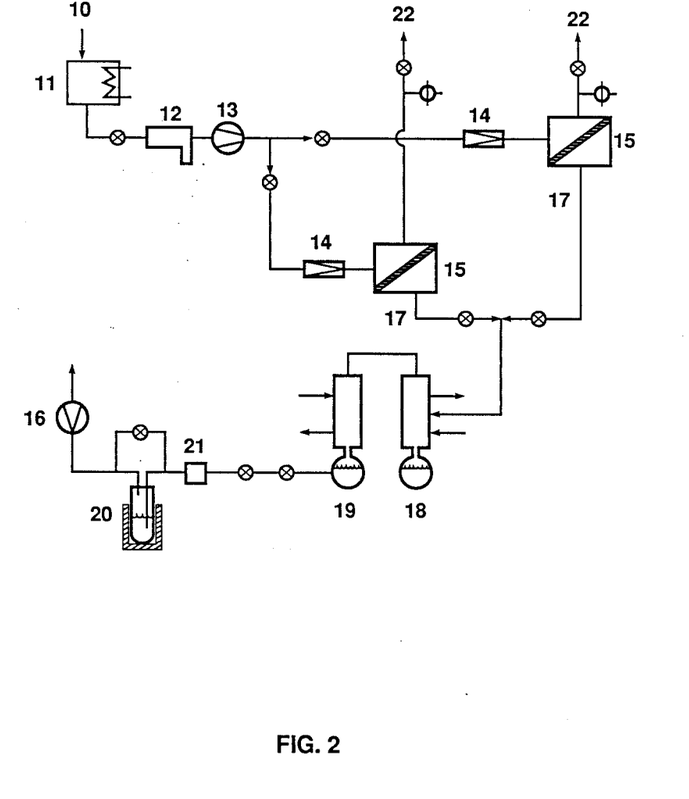
FIG. 2 is a schematic representation of an embodiment of the pervaporation process of the invention employing fractional condensation of the permeate stream.

An alternative embodiment for larger-scale commercial operation is shown in FIG. 2. In this case, the initial driving force is provided by the vacuum pump, but once the system is operating, the pressure drop is sustained by condensing the permeate vapor. Referring now to this figure, feed solution, 10, from a thermostated reservoir, 11, passes through a filter, 12, to remove any particulates that might foul the membrane, and then via a small pump, 13, through flow meters, 14, to the membrane modules, 15. A vacuum pump, 16, is used to generate the initial vacuum on the permeate side of the modules. This pump draws the permeate vapor stream, 17, through two condensers. The first condenser, 18, is water cooled to 15° to 20° C. The condensate of this condenser contains relatively low concentrations of organic compounds and, depending on the process, may be suitable for direct recycling to the pervaporation plant. The second condenser, 19, is cooled by refrigerated water at approximately 5° C. This condensate contains the bulk of the solvent vapor. Any non-condensable gases are removed by the vacuum pump which is protected from trace vapors by a nitrogen trap, 20. A manostat, 21, maintains the pressure on the permeate side of the module. The retentate stream, 22, from the membrane modules is recycled or discharged as appropriate.

It will be appreciated that in practice the system design will depend on the volume of feed to be treated, the concentration of organic in the feed, the percentage of organic recovery required, the flux and selectivity of the modules, and so on. For example, in applications where feedstreams with very dilute concentrations of organics are to be treated, and where maximum solvent recovery is desired, modules having high selectivity but relatively low flux may be best. Where large volumes of waste are to be processed, but a lesser degree of retentate purity is acceptable, high flux lower selectivity modules may be indicated. The membrane area, and hence the number of modules in the system, will also vary widely. For instance, a small scale unit designed to treat a feed flow of 10 L/minute or less, containing a few wt % organic, with 90% organic recovery, can operate with one spiral-wound module having a membrane area of 6 m². At the other end of the scale, a commercial plant capable of handling 100,000 gallons of feed per day, and reducing the organic component from 0.1 wt % to 0.01 wt % may require a membrane area of about 360 m², or 60 or more 6 m² modules. The scope of the invention should be understood as not limited to any particular type or number of modules, or other system components, as the way in which the process is carried out for any particular application will be tailored to suite the parameters of that application. A certain critical velocity of the feed solution through the membrane modules and across the membrane surface is required to minimize boundary layer concentration polarization problems. This means that to achieve a high degree of solvent removal in a single pass through the system, it will frequently be necessary to employ a multiplicity of modules arranged in series. The retentate from each module then forms the feed for the next. However this feed will be at a slightly lower temperature than the original feedstream, because of loss of heat to the permeate vapor. In large systems, then, it may be necessary to warm the feed between stages to maintain an acceptable feed temperature. This warming may be achieved by electrical heaters, by recycling cooling waters from the permeate condenser units, or by any other appropriate technique.

In theory, depending on the membrane area available, the process of the present invention could be deployed to treat any volume flow of condensates, ranging from a few liters per hour up to many hundreds of thousands of gallons per day. In practice, the feed flow that can be treated may be limited by economic considerations, such as the costs involved i condensing the permeate, or in providing interstage heating, or by other process design requirements.

In general, in the context of the present invention, pervaporation systems are useful and competitive with other technologies in treating aqueous streams containing low concentrations of dissolved organics. Thus it is envisaged that the process of the invention, although not necessarily limited to this range, would find preferred application in treating evaporator condensates containing 10 wt % or less organic. In many instances, the stream to be treated will contain 1 wt % or less organic, down to a few parts per million organic.

A pervaporation system can be tailored to achieve a target percentage of organic removal from the feedstream. The choice of membrane material controls the intrinsic permeability and selectivity. Permeate flux can be controlled by varying the membrane thickness, and the partial pressure gradient across the membrane. Computer models can then be used to determine the membrane area required and the concentration of organic in the permeate. Where the prime goal of the pervaporation process is to reduce the level of organic in the condensate to a level at which safe discharge to the environment is possible, removal of 90% organic, say from 1 wt % to 0.1 wt % may be acceptable. In instances where recovery of a valuable, or highly toxic, solvent is the aim, recovery rates of 99% or greater may be called for. Computer models show that an increase in solvent removal from 90 to 99% requires a twofold increase in the size of plant required. Similarly a further increase to 99.9% solvent removal requires a plant three times larger than that needed for 90% removal. This may set the limit on the degree of solvent recovery that is practical in any given situation.

The invention is now further described by detailed examples showing specific embodiments. These examples are intended to be illustrative of the invention, but non-limiting.

TESTS WITH INDUSTRIAL SOLUTIONS

Figure 1:
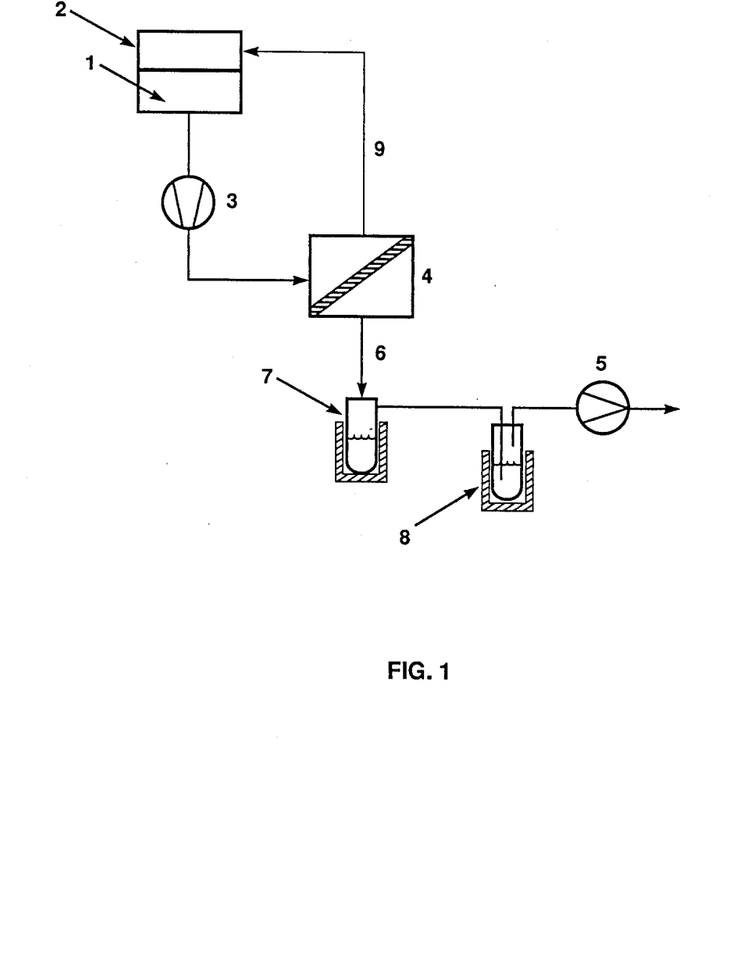
FIG. 1 is a schematic representation of a beach-scale pervaporation system.

Pervaporation experiments were performed with two industrial feed streams. The samples were tested on the bench-scale test loop, as shown in FIG. 1, with a 2-inch-diameter module. The first sample was the vapor condensate from the multiple-effect evaporator and concentrator from a paper and pulp mill, supplied by the Weyerhaeuser Paper Co., Tacoma, Wash. The solution contained methanol and other volatile organic solvents, and the potential for methanol recovery from the streams was examined.

The second sample consisted of aqueous condensate from orange juice evaporation, obtained from Sunkist Growers, Inc., Ontario, Calif., to evaluate the pervaporation potential in fruit juice concentration. The goal here was recovery of ethanol and the various essences contained in the condensate.

EXAMPLE 1

Methanol Recovery from Black Liquor Condensate

The pulp mill vapor condensate contained 100 to 500 ppm methanol as well as various oils, fuel oils and turpentines. Composite membranes were prepared by casting a microporous polysulfone support membrane on a polyester web, then overcoating with silicone rubber. The finished membrane had an effective silicone rubber thickness of 1 micron. A spiral-wound module with a membrane area of approximately 0.17 m$^2$ was used. The test operating conditions are given in Table 1. The pervaporation test loop was as shown in FIG. 1.

TABLE 1

Methanol recovery from black liquor condensate.
Test and operating parameters.

| | |
|---|---|
| Membrane: | Silicone rubber, thin-film composite one micron thick |
| Membrane area: | 0.17 m$^2$ |
| Sample volume: | 15 liters |
| Feed volume flow: | 5 L/min, recirculated |
| Feed temperature: | 40° C. |
| Permeate pressure: | 2.0 cmHg |

Figure 3:
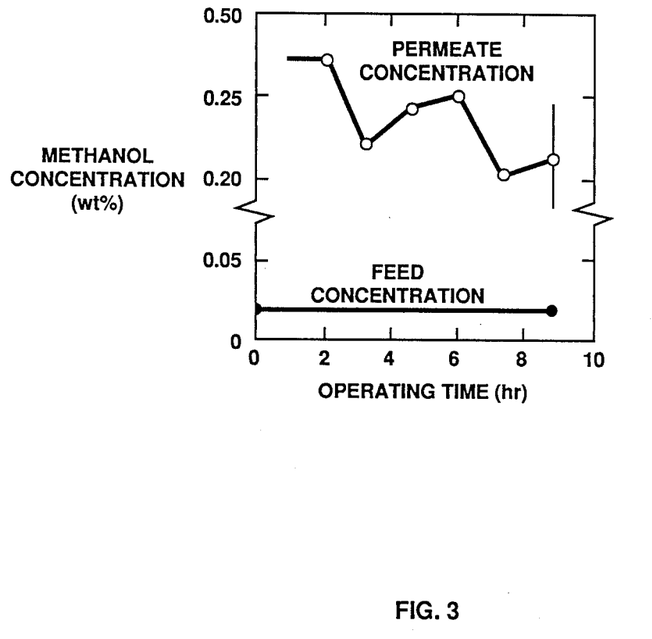
FIG. 3 is a graph showing methanol concentration in the feed and permeate streams for black liquor condensate waters from a pulp mill.

FIG. 3 shows the results obtained during a 9-hour test. The methanol, at concentrations of 200 ppm in the feed, was enriched up to 15 times. A permeate flux of about 0.4 L/m$^2$.hr was obtained.

EXAMPLE 2

Ethanol/Essence Recovery from Orange Juice Evaporator Condensates

Typical volatile flavor elements found in orange juice evaporator condensates are listed in Table 2.

TABLE 2

Compounds Present in the Equilibrium Vapor Above Florida Orange Juice

| | | | |
|---|---|---|---|
| Acetaldehyde | Ethyl n-caprylate | Methyl heptenol | 2-Octenal |
| Acetone | | | n-Octyl |
| n-Amylol | Ethyl formate | Methyl isovalerate | butyrate |
| Δ3-Carene | | | n-Octyl |
| trans-Carveol | Geranial | Methyl-n-methyl anthranilate | isovalerate |
| L-Carvone* | Geraniol | | α-Pinene* |
| Citronellol | n-Hexanal | B-Myrcene* | 1-Propanol |
| p-Cymene | 2-Hexanal | Neral | α-Terpineol |
| n-Decanal | n-Hexanol | Nerol | Terpinen-4-ol |
| Ethanol | 2-Hexenol | n-Nonanal | α-Terpinene |
| Ethyl | 3-Hexenol | 1-Nonanol | γ-Terpinene |
| acetate | d-Limonene* | 2-Nonanol | Terpinolene |
| Ethyl | Linalool | n-Octanal* | Terpinyl acetate |
| butyrate | Methanol | n-Octanol* | n-Undecanal |

*Proved to be closely associated with characteristic flavor.

A sample of orange juice condensate was obtained and tested on the small-scale pervaporation loop as shown in FIG. 1. The test was performed using a silicone rubber spiral-wound module with approximately 0.17 m$^2$ membrane area as in Example 1. The feed temperature was maintained with a thermostated water bath at 30° C. The test operating conditions are listed in Table 3.

TABLE 3

Ethanol/Essence recovery from orange juice evaporator condensates.
Test parameters.

| | |
|---|---|
| Sample volume: | 3.75 liters |
| Ethanol concentration (wt. %): | 9.2% (per Sunkist) |
| Feed volume flow: | 5 L/min |

TABLE 3-continued

Ethanol/Essence recovery from orange juice evaporator condensates.
Test parameters.

| | |
|---|---|
| Feed temperature: | 30° C. |
| Permeate pressure: | 2.0 cmHg |
| Test duration: | 8 hours |

Figure 4:
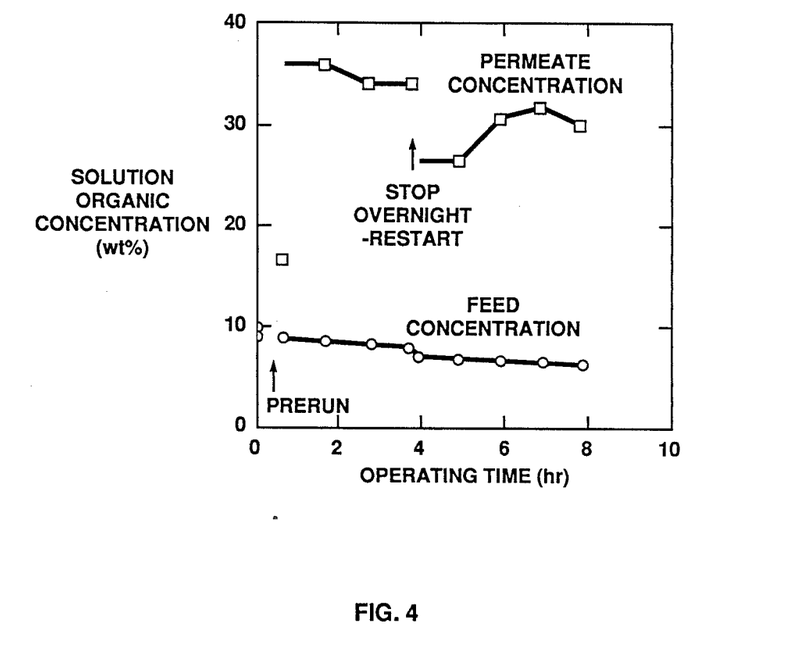
FIG. 4 is a graph showing organic component concentration in the feed and permeate streams for orange juice evaporator condensate.

FIG. 4 shows the results obtained during an 8-hour test. The combined alcohol content is enriched fourfold, from approximately 8 wt % in the feed solution up to 36 wt % in the permeate solution. The permeate flux was about 0.3–0.35 L/m$^2$.hr.

Figure 5:
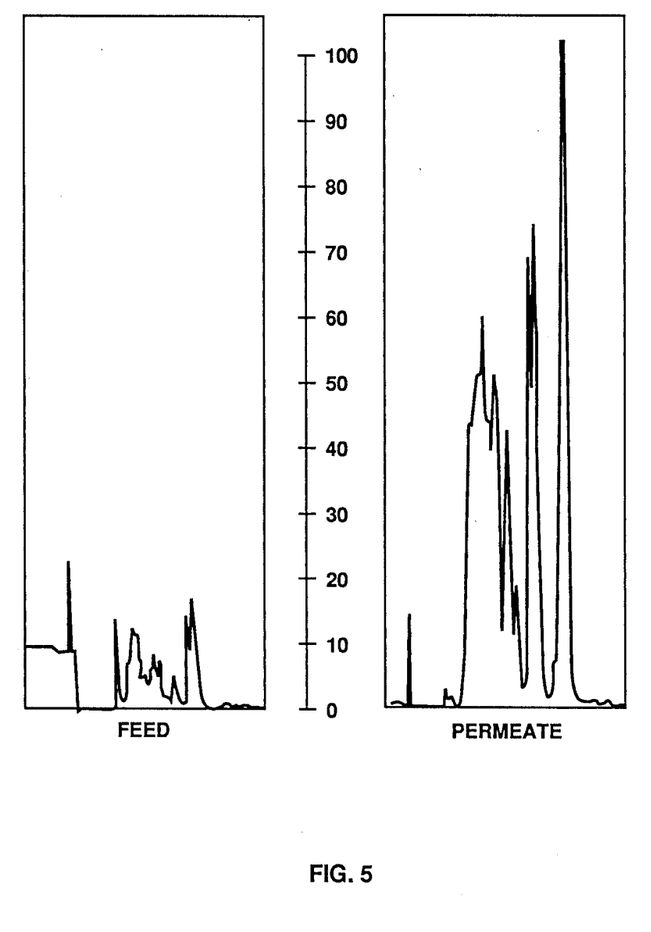
FIG. 5 shows HPLC traces from the feed and permeate streams from an orange juice condensate pervaporation test.

Samples of the feed and permeate solutions were analyzed by high pressure liquid chromatography using acetonitrile-water, an Analytical Instruments W 3476-C18 column, and a 254-nm ultraviolet detector. The results are shown in FIG. 5. There are a number of peaks representing the volatile compounds, namely esters, aldehydes and higher alcohol fractions. Several of these compounds were concentrated 20-fold and more.

EXAMPLES 3 AND 4

Economic Analyses

Two potential applications of pervaporation are considered. The first is removal of small amounts of organic solvents such as 1,1,2-trichloroethane from water. Streams such as this might be encountered from evaporative processes used in connection with the cleaning and drying of metal or electronics parts. The objective here is to solve a pollution control problem. The competitive technologies are carbon adsorption and air stripping. Typical feed streams in this case contain 100 to 1,000 ppm solvent.

The second application is the recovery of dissolved organic solvents from industrial process streams. The objective here is to recover a valuable product. The competitive technologies are solvent extaction, and distillation. Typical feed streams in this case contain from 1–5% solvent, and might be encountered as fruit juice evaporator condensates.

EXAMPLE 3

Pollution Control

As the base case for an analysis of solvent removal from a contaminated water stream, consider a system designed to treat 100,000 gallons of feed water per day, containing 0.1 wt % of dissolved organic solvent. It is assumed that the membrane removes 90% of this dissolved solvent to produce an effluent stream containing approximately 0.01 wt % organic. Laboratory data shows an average membrane flux of 0.5 L/m$^2$hr and an intrinsic membrane selectivity to the dissolved organics over water of 200 to be reasonable.

To calculate the pervaporation system's performance, a cross-flow model is used. In the cross-flow model, the feed solution flows parallel to the membrane, permeate solution flows perpendicular to and away from the membrane. Spiral-wound membrane modules operate in this cross-flow pattern.

Using the operating conditions described above, the permeate concentration and membrane area can be calculated using a computer program. The results of this calculation are summarized in Table 4. As shown, the pervaporation plant is able to remove 90% of dissolved solvent, producing a concentrate stream containing 7.4% solvent.

TABLE 4

Cross Flow Pervaporation Plant. Base Case Operating Characteristics

| | |
|---|---|
| Membrane normalized flux | 0.5 L/m²hr |
| Membrane selectivity organic/water | 200 |
| Membrane area | 362 m² |
| Feed flow | 100,000 gal/day (16,000 L/hr) |
| Permeate flow | 1,240 gal/day (195 L/hr) |
| Feed concentration | 0.10 wt. % |
| Retentate concentration | 0.01 wt. % |
| Permeate concentration | 7.4 wt. % |

The capital cost components of this system are divided into five categories. The cost of the feed solution pump, the system vacuum pump, the membrane modules and pressure vessels, the permeate condenser, the control, frame and instrumentation costs and finally the system's assembly costs. Feed pump costs are determined from the 1986 W. W. Grainger catalogue. It is assumed that a feed pump pressure of 10 psig is required to circulate the feed solution through the pervaporation plant. The vacuum pump has been sized based on laboratory experience with a single four-inch-module test loop. It is assumed that a single 1-hp pump, costing approximately $1,000, is required to provide the initial vacuums required for five modules. The pump would only operate for perhaps 10% of the system operating time to remove all air that has leaked into the system. The membrane module pressure vessel, taken from vendor quotes, is assumed to be $100/m² of membrane or approximately $500 for a 4×40-inch membrane module. The permeate condenser cost is calculated from published tables for carbon steel, tube and shell condensers. Finally, frame, piping, controls, etc., are taken to be 100% of the other fixed equipment costs. Assembly costs are taken to be 20% of all fixed hardwood costs. A membrane module cost of $100/m² is assumed. This cost is generous, especially for large plants. In reverse osmosis plants using spiral-wound modules of similar design, membrane module costs can be as low as $30 to $50/m².

Based on the assumptions given above, the capital costs of a 363-m² plant required to treat a flow of 100,000 gal/day of feed are shown in Table 5. The total system costs, including membranes, is $187,070.

TABLE 5

Cross Flow Pervaporation Plant. Base Case Capital Costs

| | | |
|---|---|---|
| Feed pump | $ | 460 |
| Vacuum pump | | 14,000 |
| Condensers | | 12,230 |
| Module pressure vessels (@ $100/m²) | | 36,180 |
| Major Components Subtotal | $ | 62,870 |
| Instrumentation, frame, etc., @ 100% of major components cost | | 62,870 |
| Total System Equipment Cost | $ | 125,740 |
| Cost of Membranes (@ $100/m²) | | 36,180 |
| Assembly and Installation, @ 20% of total equipment cost | | 25,150 |
| TOTAL CAPITAL COST | $ | 187,070 |

System operating costs are given in Table 6. Fixed costs to cover depreciation and taxes are taken to be 15% of installed system costs, excluding the membranes. A membrane life of three years, comparable to that routinely achieved in reverse osmosis systems, has been assumed. The cost of operating the feed and vacuum pumps is small, but the cost of cooling for the condensers is substantial. (A refrigeration cost of $1.90/ton.day or 288,000 Btu removed is assumed). Annual maintenance and labor is taken to be 10% of the total capital cost, including the membrane modules. Based on these estimates, the operating cost of the system is $2.36/1,000 gallon of feed.

TABLE 6

Cross Flow Pervaporation Plant, Base Case Operating Costs

| | |
|---|---|
| Fixed costs @ 15% of total installed cost | $22,630 |
| Module replacement (3-year lifetime) | 12,060 |
| Maintenance/labor (@ 10% of investment) | 18,710 |
| Feed pump energy (@ $.05/kWhr) | 160 |
| Vacuum pump energy (@ 10% load factor) | 420 |
| Refrigeration costs (@ $1.90/ton.day) | 25,980 |
| Total Annual Operating Cost | $79,960 |
| Total Annual Operating Cost/ 1,000 gal feed | $2.36/1,000 gal |

EXAMPLE 4

Solvent Recovery

As the base case for an analysis of solvent recovery from an industrial process stream, consider a system designed to treat 100,000 gallons of feed water per day containing 2.0 wt % of dissolved organic solvent. It is assumed that the membrane removes 90% of the solvent to produce an effluent stream containing 0.2 wt % solvent. At this concentration of solvent, the flux through the membrane increases in proportion to the solvent content. For the base case, assume this membrane has a pure water flux of 0.5 L/mhr² and that this increases linearly with solvent concentration up to 1 L/mhr² at 2 wt % solvent. Finally, a membrane selectivity of 100 is assumed.

A computer model as in Example 3 is used. The operating characteristics of this plant are shown in Table 7. These characteristics are then combined with the cost assumptions as in Example 3 to yield the capital and operating costs of the systems. The calculations are summarized in Tables 8 and 9.

TABLE 7

Cross-Flow Pervaporation Plant. Base Case Operating Characteristics

| | |
|---|---|
| Membrane normalized flux: | |
| pure water | 0.5 L/m²hr |
| 2 wt. % solvent | 1.0 L/m²hr |
| Membrane selectivity organic/water | 100 |
| Membrane area | 685 m² |
| Feed flow | 100,000 gal/day (16,000 L/hr) |
| Permeate flow | 4,000 gal/day (630 L/hr) |
| Feed concentration | 2.00 wt. % |
| Retentate concentration | 0.24 wt. % |
| Permeate concentration | 45.7 wt. % |

TABLE 8

Cross-Flow Pervaporation Plant, Base Case Capital Costs

| | |
|---|---|
| Feed pump | $ 460 |
| Vacuum pump | 27,000 |
| Condensers | 39,130 |
| Module pressure vessels (@ $100/m²) | 68,510 |
| Major Components Subtotal | $135,000 |
| Instrumentation, frame, etc., | 135,000 |

TABLE 8-continued

| Cross-Flow Pervaporation Plant, Base Case Capital Costs | |
|---|---|
| @ 100% of major components cost | |
| Total System Equipment Cost | $270,200 |
| Cost of Membranes (@ $100/m$^2$) | 68,510 |
| Assembly and Installation, @ 20% of total equipment cost | 54,040 |
| TOTAL CAPITAL COST | $392,750 |

TABLE 9

| Cross Flow Pervaporation Plant, Base Case Operating Costs | |
|---|---|
| Fixed costs @ 15% of total installed cost | $48,640 |
| Module replacement (3-year lifetime) | 22,840 |
| Maintenance/labor (@ 10% of investment) | 39,280 |
| Feed pump energy (@ $.05/kWhr) | 160 |
| Vacuum pump energy (@ 10% load factor) | 810 |
| Refrigeration costs (169 $1.90/ton.day) | 83,870 |
| Total Annual Operating Cost | $195,600 |
| Total Annual Operating Cost/ 1,000 gal feed | $5.78/1,000 gal |

The capital costs and the operating costs of this solvent recovery plant are between two and three times more than the costs for the pollution control plant designed to treat the same feed flow. On the other hand, this plant produces a permeate stream of 4,000 gallons/day containing approximately 46% organic solvent, with a value of $1,000/day or $10/1,000 gallons of feed solution.

We claim:

1. A separation process, comprising an evaporation step followed by a pervaporation step, wherein said evaporation step comprises:
   (a) providing a feed solution comprising an aqueous solvent component and a non-aqueous solute component, said non-aqueous solute component including a volatile organic component;
   (b) subjecting said feed solution to evaporation, to create an evaporated fraction wherein the concentrations of said aqueous component and said volatile organic component are enriched compared with said feed solution; and wherein said pervaporation step comprises:
   (a) providing a permselective membrane having a feed side and a permeate side;
   (b) contacting said feed side with said evaporated fraction;
   (c) withdrawing from said permeate side a permeate vapor enriched in said volatile organic component compared with said evaporated fraction;
   (d) maintaining an organic vapor pressure on said permeate side sufficient to provide a driving force for organic vapor permeation through said composite membrane by condensing said permeate vapor.

2. The process of claim 1, wherein said pervaporation step further comprises:
   (e) withdrawing from said feed side a residue liquid from which at least 90% of the organic component originally present in said evaporated fraction has been removed.

3. The process of claim 1, wherein said permselective membrane is used in the form of a spiral-wound membrane module.

4. The process of claim 1, wherein said permselective membrane is a composite membrane comprising a microporous membrane layer, coated with an ultrathin permselective layer, said permselective layer being less than 5 microns thick.

5. The process of claim 1, wherein a vapor pressure drop between 1 and 30 cmHg is maintained between said feed and permeate sides of said permselective membrane.

6. The process of claim 1, wherein said feed solution is fruit juice, and wherein said volatile organic component comprises a fruit essence.

7. The process of claim 6, wherein said fruit juice is chosen from the group consisting of orange, apple or tomato juice.

8. The process of claim 1, wherein said evaporated fraction comprises black liquor condensate.

* * * * *

UNITED STATES PATENT AND TRADEMARK OFFICE
CERTIFICATE OF CORRECTION

PATENT NO. : 4,952,751

DATED : August 28, 1990

INVENTOR(S) : Ingo Blume, Richard W. Baker

Page 1 of 6

It is certified that error appears in the above-identified patent and that said Letters Patent is hereby corrected as shown below:

Please add the Drawing Sheets, consisting of FIGS. 1-5, as shown on the attached pages.

Signed and Sealed this

Eighteenth Day of February, 1992

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,952,751

DATED : August 28, 1990

INVENTOR(S) : Ingo Blume, Richard W. Baker

It is certified that error appears in the above-identified patent and that said Letters Patent is hereby corrected as shown below:

FIG. 1

UNITED STATES PATENT AND TRADEMARK OFFICE
CERTIFICATE OF CORRECTION

PATENT NO. : 4,952,751            Page 3 of 6

DATED : August 28, 1990

INVENTOR(S) : Ingo Blume, Richard W. Baker

It is certified that error appears in the above-identified patent and that said Letters Patent is hereby corrected as shown below:

FIG. 2

UNITED STATES PATENT AND TRADEMARK OFFICE
CERTIFICATE OF CORRECTION

PATENT NO. : 4,952,751

DATED : August 28, 1990

INVENTOR(S) : Ingo Blume, Richard W. Baker

It is certified that error appears in the above-identified patent and that said Letters Patent is hereby corrected as shown below:

FIG. 3

UNITED STATES PATENT AND TRADEMARK OFFICE
CERTIFICATE OF CORRECTION

PATENT NO. : 4,952,751

DATED : August 28, 1990

INVENTOR(S) : Ingo Blume, Richard W. Baker

It is certified that error appears in the above-identified patent and that said Letters Patent is hereby corrected as shown below:

FIG. 4

UNITED STATES PATENT AND TRADEMARK OFFICE
CERTIFICATE OF CORRECTION

PATENT NO. : 4,952,751

DATED : August 28, 1990

INVENTOR(S) : Ingo Blume, Richard W. Baker

It is certified that error appears in the above-identified patent and that said Letters Patent is hereby corrected as shown below:

FIG. 5